US008160947B2

(12) United States Patent
Oey

(10) Patent No.: US 8,160,947 B2
(45) Date of Patent: Apr. 17, 2012

(54) METHODS AND SYSTEMS FOR IDENTIFYING AND TRACKING POTENTIAL PROPERTY RIGHTS IN SOFTWARE PRODUCTS

(75) Inventor: Timothy S. Oey, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1314 days.

(21) Appl. No.: 10/941,430

(22) Filed: Sep. 15, 2004

(65) Prior Publication Data

US 2006/0059061 A1 Mar. 16, 2006

(51) Int. Cl.
*G06Q 40/00* (2012.01)
(52) U.S. Cl. ................................. 705/36 R
(58) Field of Classification Search ............ None
See application file for complete search history.

(56) References Cited

U.S. PATENT DOCUMENTS

| | | | | | |
|---|---|---|---|---|---|
| 5,448,729 | A | * | 9/1995 | Murdock | 707/104.1 |
| 5,469,354 | A | * | 11/1995 | Hatakeyama et al. | 707/3 |
| 5,907,848 | A | * | 5/1999 | Zaiken et al. | 707/202 |
| 6,134,664 | A | * | 10/2000 | Walker | 726/22 |
| 6,604,108 | B1 | * | 8/2003 | Nitahara | 707/102 |
| 6,728,773 | B1 | * | 4/2004 | Corless | 709/229 |
| 6,990,526 | B1 | * | 1/2006 | Zhu | 709/227 |
| 7,050,555 | B2 | * | 5/2006 | Zargham et al. | 379/115.01 |
| 7,133,846 | B1 | * | 11/2006 | Ginter et al. | 705/54 |
| 2002/0040337 | A1 | * | 4/2002 | Kikuchi | 705/36 |
| 2002/0049760 | A1 | * | 4/2002 | Scott et al. | 707/10 |
| 2003/0069748 | A1 | * | 4/2003 | Shear et al. | 705/1 |
| 2003/0167213 | A1 | * | 9/2003 | Jammes et al. | 705/27 |
| 2003/0200337 | A1 | * | 10/2003 | Jabri et al. | 709/246 |
| 2003/0225742 | A1 | * | 12/2003 | Tenner et al. | 707/2 |
| 2004/0015712 | A1 | * | 1/2004 | Szor | 713/200 |
| 2004/0039704 | A1 | * | 2/2004 | Gilliam et al. | 705/50 |
| 2005/0021434 | A1 | * | 1/2005 | D'Loren | 705/36 |
| 2005/0125358 | A1 | * | 6/2005 | Levin et al. | 705/59 |

(Continued)

OTHER PUBLICATIONS

PR Newswire; Vidius Releases PortAuthority® 3.0 Showcasing New Functionality to Combat Leaks of Confidential and Private Information; Beverly Hills, California; Aug. 16, 2004.*

(Continued)

*Primary Examiner* — Alexander Kalinowski
*Assistant Examiner* — Virpi Kanervo
(74) *Attorney, Agent, or Firm* — Robert C. Kowert; Meyertons, Hood, Kivlin, Kowert & Goetzel, P.C.

(57) ABSTRACT

Methods and systems for identifying and tracking potential property rights in a software product and useful in auditing the software product are disclosed. Files of the software product are scanned to determine potential property rights, preferably by scanning the source code of the files to identify certain textual strings and/or by scanning the file system information for the files. The files are fingerprinted, which can be used to retrieve previous audit records in the event of a match. New audit records are established for unmatched files, which are automatically populated with potential property rights information determined during the scan. Each audit record is opened in a record viewing/auditing application to allow diligence information to be reviewed and/or entered for each of the files. Licensing records are also preferably established, which summarize relevant licensing obligations, and which are linked with the audit records of affected files. From the audit records and/or the license records, various reports can be generated to allow the user to review relevant property rights diligence information and/or to take appropriate action in response.

63 Claims, 13 Drawing Sheets

U.S. PATENT DOCUMENTS

2005/0210127 A1* 9/2005 Pohja et al. ............... 709/224
2005/0262001 A1* 11/2005 Stewart ..................... 705/36

OTHER PUBLICATIONS

Michael Franz; The Case for Universal Symbol Files; Structured Programming; 14, pp. 136-137; (1993).*

Elisabetta Iossa and Patrick Legros; Auditing and Property Rights; The Rand Journal of Economics; vol. 35, No. 2, pp. 356-372; (Summer 2004).*

Palamida: Briefing Paper: Automated Component License Management (Apr. 2004).

Palamida: Palamida, Inc. Product Overview: Automated Component License Management (Apr. 2004).

Black Duck Software: The Need for Comprehensive Source Code Assurance (2004).

Black Duck Software: Solutions for Software IP Risk Management (2004).

Palamida: Audit Results for Myco, Inc. (May 17-19, 2004).

* cited by examiner

| | A | B | C | D | E |
|---|---|---|---|---|---|
| 1 | File_Sequence | PathName | Checksum | Matched_String | Criteria |
| 2 | 4 | \AcroTalk\broker\Acrobat\WHA Library.DEU | 6576EAE9F00D2016B3ADCC20FE3C851E | "COPYRIGHT=(c) Copyright 2001, Adobe Systems Incorporated.\nAll rights reserved.' 'IDS_ABOUT_LEGAL=&Legal" | copyright |
| 3 | 4 | \AcroTalk\broker\Acrobat\WHA Library.DEU | 6576EAE9F00D2016B3ADCC20FE3C851E | Copyright 2001, Adobe Systems Incorporated.\nAll rights reserved.' 'IDS_ABOUT_LEGAL=&Legal' 'IDS_ABOUT_CRED | copyright |
| 4 | 5 | \AcroTalk\broker\Acrobat\WHALibrary.bin | 6898A80DDA1E578EC8863231BB422BAD | COPYRIGHT2$$$IDS_ABOUT_LEGAL04$$$IDS_ABOUT_CREDITS0$$$IDS_ABOUT_CREDIT_STUFF0:$$$IDS_ABOUT_CREDIT_STUFF2□:$ | copyright |
| 5 | 5 | \AcroTalk\broker\Acrobat\WHALibrary.bin | 6898A80DDA1E578EC8863231BB422BAD | Copyright (c) Adobe Systems, Inc. 2000□ COPYRIGHT$$$IDS_MENU_AB | copyright |

*Figure 5*

| | A | B | C | D | E | F | G | H | I |
|---|---|---|---|---|---|---|---|---|---|
| 1 | File_Sequence | PathName | Size | Created | Modified | File_Version | File_Description | Company_Name | Language |
| 2 | 1 | \AcroTalk\broker\Acrobat\index.cgi | 838740 | 5/13/2004 11:10 | 1/13/2003 14:34 | | | | |
| 3 | 2 | \AcroTalk\broker\Acrobat\version.xml | 514 | 5/13/2004 11:10 | 1/13/2003 14:34 | | | | |
| 4 | 3 | \AcroTalk\broker\Acrobat\WHA Library DEU.bin | 4992 | 5/13/2004 11:10 | 1/13/2003 14:34 | | | | |
| 5 | 4 | \AcroTalk\broker\Acrobat\WHA Library.DEU | 20480 | 5/13/2004 11:10 | 1/13/2003 14:34 | 0.2.0.0 | Adobe Acrobat Plugin WHAPI | Adobe Systems Incorporated | English (United States) |
| 6 | 5 | \AcroTalk\broker\Acrobat\WHALibrary.bin | 346368 | 5/13/2004 11:10 | 1/13/2003 14:34 | | | | |
| 7 | 6 | \AcroTalk\broker\Acrobat\WHALibrary.dll | 167936 | 5/13/2004 11:10 | 1/13/2003 14:34 | 0.2.0.0 | Adobe Acrobat Plugin WHAPI | Adobe Systems Incorporated | English (United States) |
| 8 | 7 | \AcroTalk\broker\Acrobat\whapplist.xml | 11098 | 5/13/2004 11:10 | 1/13/2003 14:34 | | | | |
| 9 | 8 | \AcroTalk\WebFetcher\FileString\FileString.cpp | 4913 | 5/26/2004 18:54 | 1/13/2003 14:34 | | | | |
| 10 | 9 | \AcroTalk\WebFetcher\FileString\FileString.dsp | 4639 | 5/26/2004 18:54 | 1/13/2003 14:34 | | | | |
| 11 | 10 | \AcroTalk\WebFetcher\FileString\FileString.dsw | 543 | 5/26/2004 18:54 | 1/13/2003 14:34 | | | | |
| 12 | 11 | \AcroTalk\WebFetcher\FileString\FileString.h | 1421 | 5/26/2004 18:54 | 1/13/2003 14:34 | | | | | to Fig. 6B

*Figure 6A*

| | J | K | L | M | N | O |
|---|---|---|---|---|---|---|
| 1 | Orig_File_Name | Product_Name | Product_Version | File_Copyright | Content_MD5 | Path_MD5 |
| 2 | | | | | 83A8449A1200C23FC94DB6BDEB9DBCA9 | D16002773F8CE8AF0F5D5199A81C932D |
| 3 | | | | | E2A513A985CCC9BD0DB5CB6A3B04C64F | 91B7132513F9899FF67245FF9CE154E0 |
| 4 | | | | | 11884AFEB2C497B80F052C071DF88452 | 87754C9F529BF6C1A3EA13E8B9B5EE9E |
| 5 | | | | Copyright Adobe Systems Incorporated 2000 | 6576EAE9F0D02016B3ADCC20FE3C851E | 6083830036B241BE44BC6E6E42665075A |
| 6 | | | | Copyright Adobe Systems Incorporated 2000 | 6898A80DDA1E578EC88632318B422BAD | D0D944295 20AC6AF34E120EB4820F747 |
| 7 | | | | | 605B6C94E648C4296E880E24819B4428 | 1AE968864244146396C3B29959E3F260 |
| 8 | | | | | 5980F082CAA69ED66D718AD9C0BA2C1C | 7F710E0CC5695F9D46D94ED07F953D57 |
| 9 | | | | | 2F44E7DCAA6A5E3185A0A4A440407CF2 | 4CA6C1BF5516A627D4E29E526A8A5BD2 |
| 10 | | | | | 8065330E057C84763B37AB1179D1D62D | AB0040E52F35FAB56399 4664E06E9D8D |
| 11 | | | | | E5C0CF793692ACB6774C2CB0981B0DFA | 4303DD9B1E866990BE605FEFB693E840 |
| 12 | | | | | E0C90D31C96520DCF77469DE695DCFD8 | 45135A618CE43F97E5632751 6FB6B38A | to Fig. 6A

*Figure 6B*

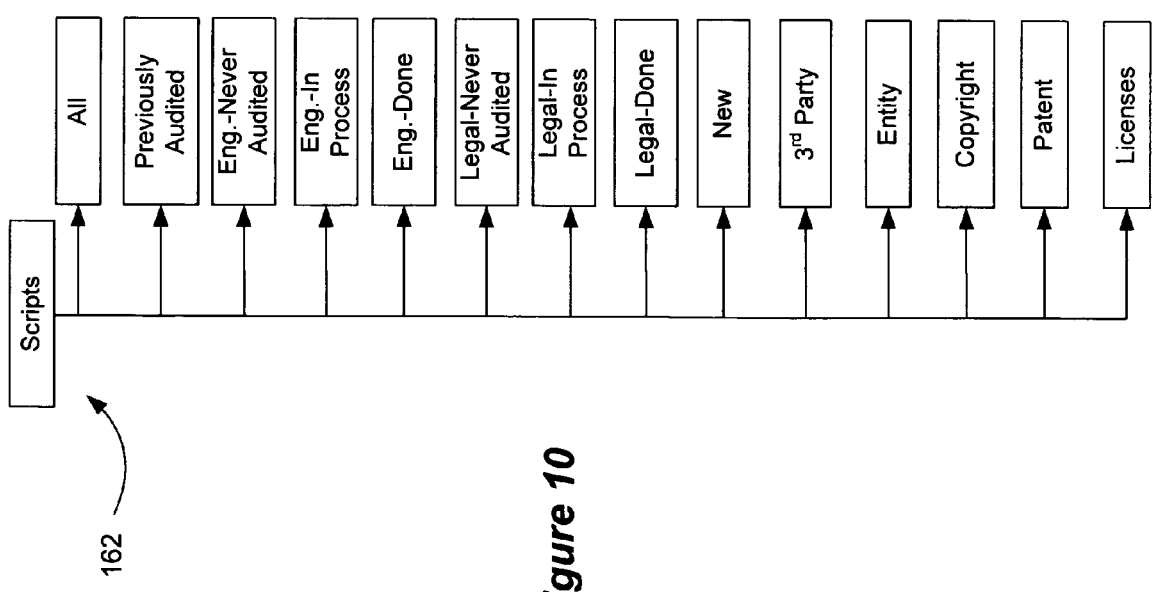

*Figure 14*

METHODS AND SYSTEMS FOR IDENTIFYING AND TRACKING POTENTIAL PROPERTY RIGHTS IN SOFTWARE PRODUCTS

FIELD OF THE INVENTION

This invention relates in general to computer software, and specifically to methods for identifying and tracking intellectual property or other property rights in software products.

BACKGROUND

While software products can be written from scratch, it is typical that new software products incorporate at least some amount of computer coding that is preexisting. Such preexisting coding can comprise certain lines of computer code, source files, content files, or other data structures as one skilled in the art will understand (hereinafter collectively referred to as "preexisting files" or "files" in this disclosure). For example, a sophisticated software product such as would run in a Windows™ operating system might include tens of thousands of preexisting files.

Each of these preexisting files in a new software product may be subject to a property right of some kind. For example, a preexisting file may be subject to a copyright, a patent, a trademark, a trade secret, a claim of ownership, or other proprietary rights, or may be licensed from a third party holding such rights (hereinafter "property rights" for simplicity). Moreover, a preexisting file, if licensed for example, may be subject to certain restrictions on how the preexisting file can be used (e.g., for educational non-commercial uses only), and/or may be subject to other requirements (e.g., that any new software product incorporating the preexisting file by "marked" in a certain way (such as with a copyright notice) to give public notice of the affected rights). In short, entities that compile or produce new software products have good reason to understand the property rights present in preexisting files in a new software product to ensure that third party property rights are being respected.

Additionally, the compiling or producing entity similarly has an interest in understanding whether its own preexisting files are used in a new software product. Such interest is spurred by similar concerns, such as ensuring that the software product is properly marked, and/or is properly respected by others who might license or use it.

Additionally, end users or licensees of a new software product too have a need to understand the property rights present in a new software product. As well as wishing to ensure proper respect of the producing entity's property rights in the new software product, the end user or licensee may want to verify that the producing entity has valid rights to any third party property rights to ensure that its use of the new software product will not be subject to a third party's claim.

Because of these concerns, software producing entities and resulting end user or licensees typically perform some level of legal diligence before the release or use of new software products. However, it is believed that to date most of this diligence has been manually accomplished. This proves to be a very laborious process, as the person tasked with such diligence must first determine what preexisting files are present in the new software product, and then determine what property rights such preexisting files are subject to, if any. Typically such diligence is performed by hand (i.e., by reviewing license agreements, by reviewing the source code for notices pertaining to property rights, etc.), or may lend itself to informal inquiries to coworkers involved in compiling the new software product whose memories or records might be incomplete. It should therefore be appreciated that such a manual undertaking can be immense and error prone, especially when dealing with a new software product containing tens of thousands of preexisting files. Moreover, if the diligence process concerning a particular file is not well-recorded, such diligence may be needlessly and redundantly performed again at a future date.

Accordingly, the software art would be benefited by improved and at least semi-automated methods for identifying and tracking the various property rights that might be present in a new software product. This disclosure provides such solutions.

SUMMARY

Disclosed herein are method and systems for identifying and tracking potential property rights in a software product useful in auditing the software product. In a preferred embodiment, a software product contains a plurality of files, which may be new or preexisting, and which may be subject to potential property rights. The files are scanned to determine potential property rights, preferably by scanning the source code (i.e., content) of the files to identify certain textual strings and/or by scanning the file system information for the files. Additionally, the files are fingerprinted with unique electronic identifiers. The fingerprints for the files are used to query a database containing audit records previously stored in the system and if a match is found, the audit records for those files are retrieved. If no match is found, then new audit records are established for the unmatched files, which are automatically populated with any potential property rights information determined during the scan.

Each of the audit records for the files is opened in a record viewing/auditing application to allow diligence information to be reviewed and/or entered for each of the files. The records may be sorted according to use preferences to allow the user to deal with only a particular subset of files (e.g., those which are new or previously unaudited). Licensing records are also established, which summarize relevant licensing obligations, and which are linked with the audit records of affected files. From the audit records and/or the license records, various reports can be generated to allow the user to review relevant property rights diligence information and/or to take appropriate action in response.

Use of the disclosed system and method, in its various embodiments, provides great assistance to those auditing the software product. First, to the extent various files in the software product have been previously audited, their audit records are automatically retrieved so that diligence is not needlessly performed once again on those files. Additionally, through the creation of licensing records, once a particular file through its audit record has been linked to the licensing record, understanding licensing obligations and requirements concerning the use of the file in the software product are made automatic and through the generation of an automatic report, preferably without the need for further diligence.

BRIEF DESCRIPTION OF THE DRAWINGS

Embodiments of the inventive aspects of this disclosure will be best understood with reference to the following detailed description, when read in conjunction with the accompanying drawings, in which:

FIG. 5 illustrates the data resulting from a scan of the source code of the files indentifying potential property rights textual strings within the source code.

FIGS. 6A and 6B illustrate the data resulting from a scan of the file system information for the files identifying potential property rights information and including fingerprinting information for each of the files.

FIG. 10 illustrates how a subset of the audit records for a given software product can be chosen based on use preferences.

FIG. 11 illustrates the relationship between audit records and license records stored within the system.

FIG. 14 illustrates a "License Requirements" screen for the license record summarizing obligations under the license.

DETAILED DESCRIPTION

Figure 1:
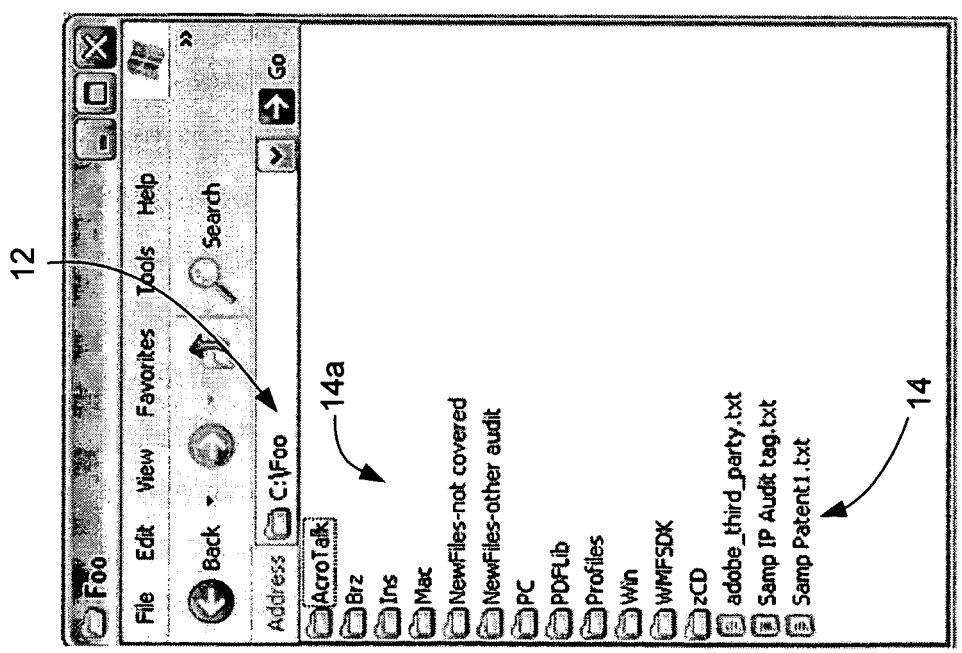
FIG. 1 illustrates a screen shot of a software product to be audited, along with the files and subfiles contained within that software product.

Referring to FIG. 1, a screen shot 10 of a user interface of a file manager illustrates some of the subcomponents files 14 of a new exemplary software product 12 (called "Foo"). As shown, Foo 12 is comprised of (and/or references) several different files 14, any of which may be subject to property rights as discussed in the Background section of this disclosure. Not all of the pertinent files 14 comprising Foo 12 are shown on the root directory, as many files are nested in folders 14a (and perhaps ultimately subfolders, sub-subfolder, etc.). Regardless, and as will be seen, the disclosed method processes and analyzes these folders (and subfolders, etc.) to assist in identifying and tracking property-related information in the subject files.

Figure 2:
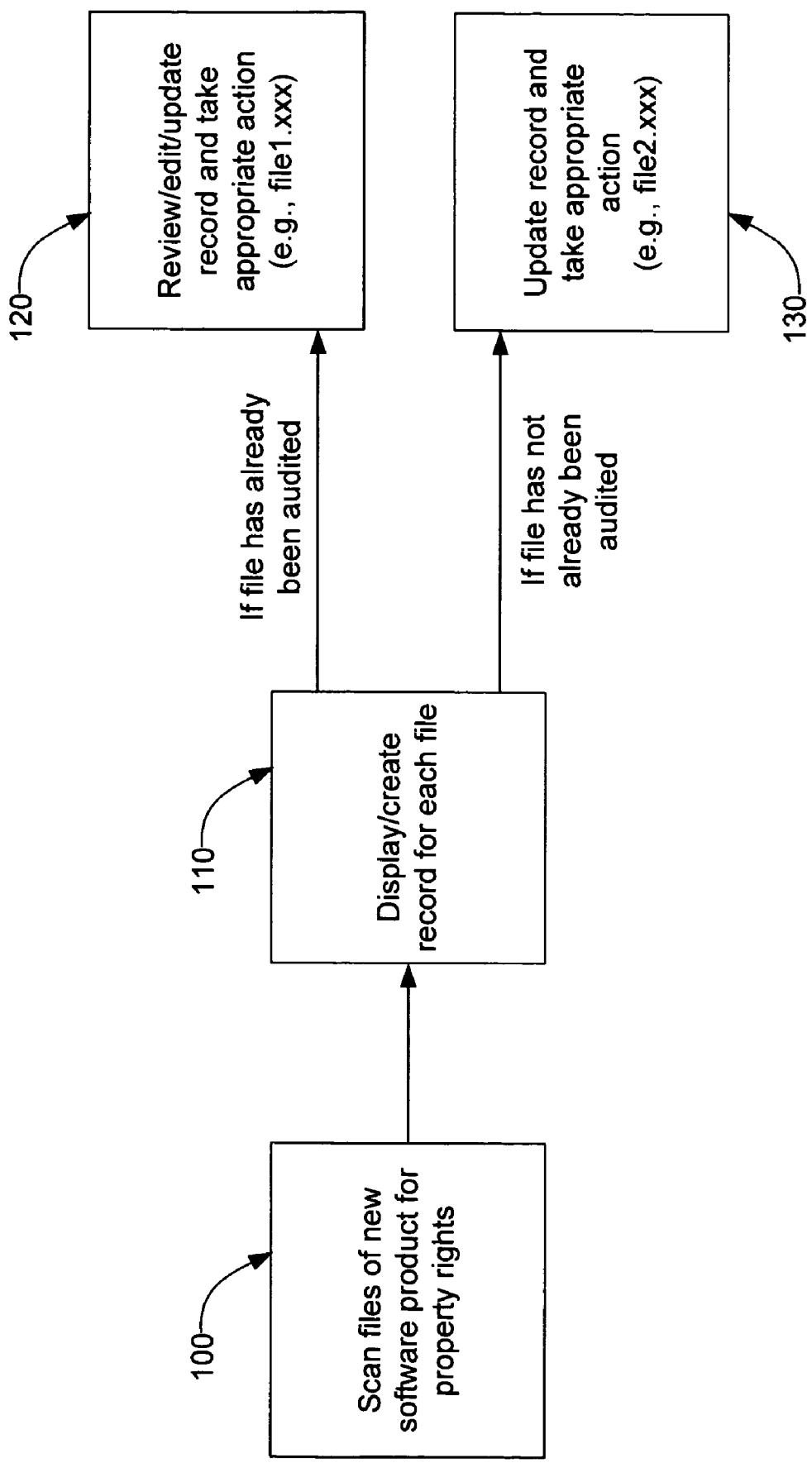
FIG. 2 illustrates the basic flow for the creation and/or retrieval of audit records for each file.

As shown in FIG. 2, the basic approach of the disclosed property rights auditing method involves scanning the files of the new software 12 product (100) to track or identify potential property rights in the files, and then later to display or create audit records concerning each of these files (110). The process in a preferred embodiment is cumulative, meaning that if a particular file in the new software product "Foo" 12 has been previously audited, the results for that previous audit have been stored by the system and are retrieved once again during the audit.

For example, suppose Foo 12 comprises two files—"file1.xxx" and "file2.xxx." Assume file1.xxx had been used in a previous software product, such that an auditing record has already been compiled for that file. In that case, the previous audit record for file1.xxx is retrieved and displayed (110) using the techniques disclosed below, and if necessary, that audit record can be reviewed, edited, or updated as necessary (120). For example, previously legal diligence performed on file1.xxx might have uncovered that this file is owned by a third party, and has been in-licensed with the requirement that any software products incorporating it be marked in a certain manner. If so, that information would already be present (or accessible via a license record) in the audit record for file1.xxx, and now can possibly merely be acted upon without having to re-perform the diligence again. Of course, if further diligence is performed on file1.xxx, the audit record can be updated as necessary.

By contrast, suppose that file2.xxx is a completely new file not previously used in a previous software product, or otherwise which has not been the subject of a previous audit. In that case, an audit record is created for file2.xxx (110), and initially is either blank, or is populated with information concerning potential property rights in the file resulting from the scan, which is described in further detail below. For example, suppose the scan picks up evidence that file2.xxx is copyrighted by a third party. The new audit record for file2.xxx would be populated with that fact, which perhaps would spur further legal diligence and review. Thus, suppose such further diligence determines that file2.xxx is the subject of a given license from a third party. The audit record could then be manually updated (130) to reflect this fact, and any other pertinent facts, such as expiration date of the license, its terms, and even a link to a copy of the license can be entered into or linked to the audit record, as will be seen in further detail below.

If the scan could not identify any potential property rights in file2.xxx, the audit record would be essentially blank, which again might spur a reviewer to perform legal diligence on that file. Suppose such diligence uncovers that file2.xxx is a new file created by the software producing entity. In that case, the audit record for file2.xxx can be populated with that fact, as well as other pertinent facts such as the date the file was created, whether it is covered by a patent or pending patent application, etc. Other action might be taken as well. For example, if company policy is to place copyright notices in the source code of its files (something that should have been picked up by the scan as discussed further below), perhaps corrective action can be taken and the source code modified accordingly.

Should another software product in the future be audited which contains both file1.xxx and file2.xxx, then the previously generated audit records for these files would be retrieved. In this manner, once an audit record for a particular file has been created, and diligence has been performed, it can be easily retrieved and relied upon again. Alternatively, retrieving the audit record can comprise merely retrieving pertinent information from that audit record which is populated into an otherwise new audit record. This might be preferred if it is desired to keep old audit records in tact, while still allowing the information in them to be supplemented for each subsequent audit. In this regard, "retrieving an audit record" as used herein should be understood as including true retrieval of the old audit record as well as other similar schemes in which information from an old audit record is populated into an otherwise new audit record. In any event, those charged with performing such diligence can save time, and hopefully will be spared redundant diligence reviews for these files each time they are used in a new software product.

Figure 3:
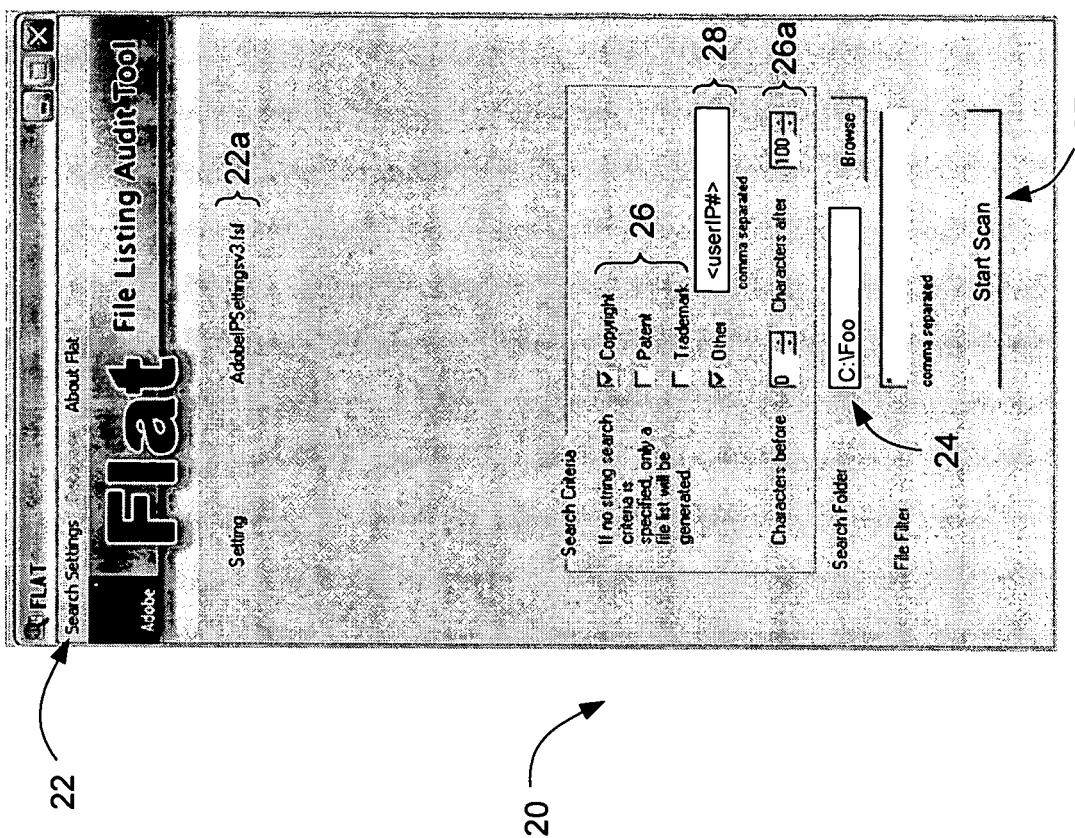
FIG. 3 illustrates a user interface to allow a user to scan the software product and to set scanning parameters designed to determine potential property rights in the files of the software product.
Figure 4:
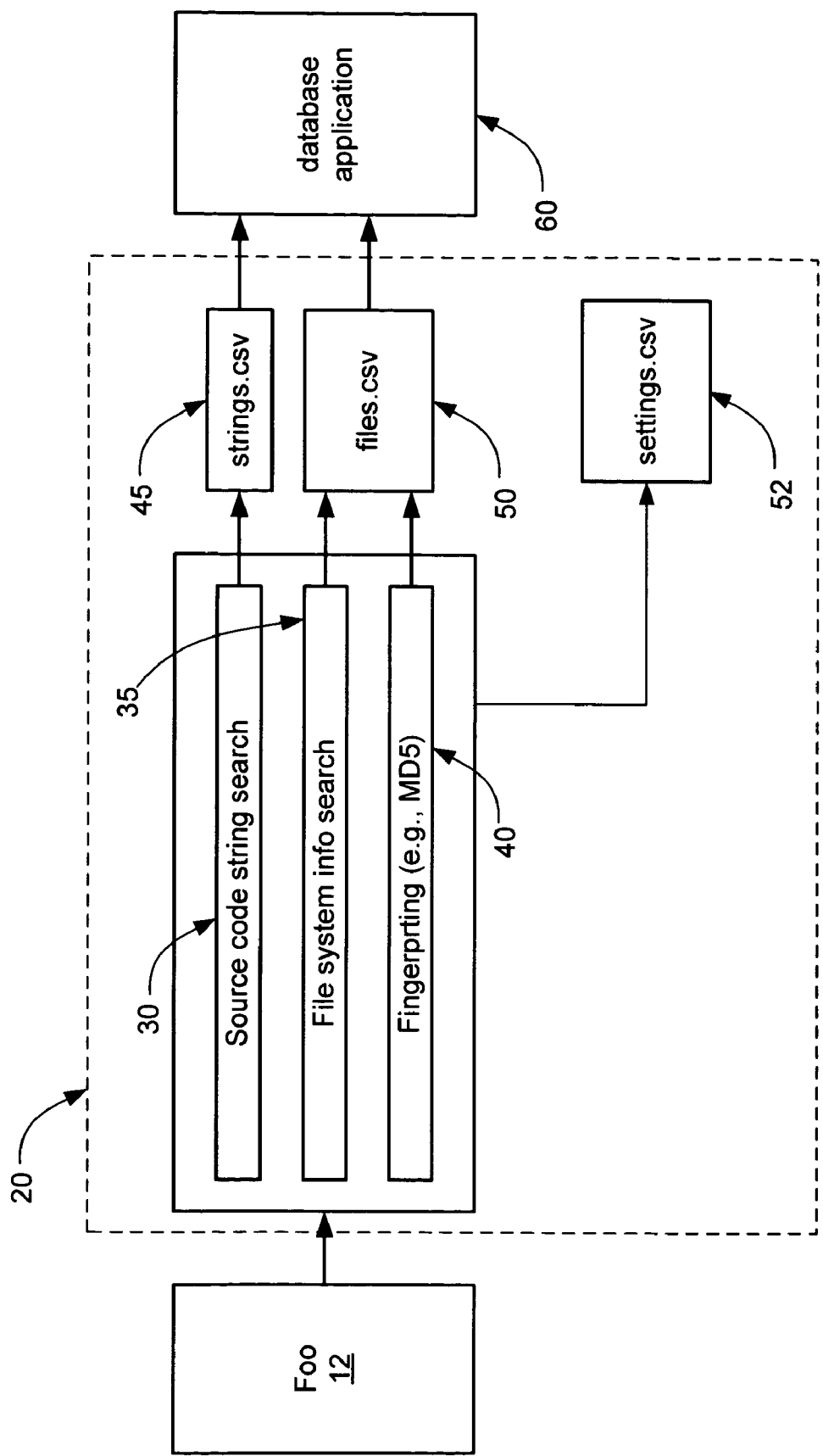
FIG. 4 illustrates the basic flow of the scanning procedure for the files, including scanning the source code for potential property rights strings, scanning the file systems information, and creation of fingerprints to allow the files to be identified and potentially linked to appropriate audit records already present in the system.

As a first step in the property rights auditing method, and as alluded to above, the files 14 within Foo 12 are scanned (100) for potential property right information using application program 20, whose user interface is shown in FIG. 3 and whose functionally is illustrated in FIG. 4. Although in an actual embodiment the steps that the application program 20 performs might preferably be integrated into a single application, one skilled in the art will recognize that each step (or substeps) can be performed by stand-alone applications linked together and sharing data so as to achieve the results disclosed herein. Thus, while certain steps are discretely illustrated herein to better illustrate the steps of the disclosed methods, this is merely illustrative and in an actual application program many of the steps would integrated and would preferably be seamless and transparent to the user.

In one embodiment, scanning of the files via application program 20 comprises a File Listing Audit Tool (called "Flat™"), as shown in the user interface screen of FIG. 3. The scanning application 20 allows the user to input the name of the software product to be scanned (Foo 12) (at 24), or more specifically the path to the location where that product resides (e.g., C:\Foo).

While some aspects of scanning for potential property rights will take place automatically pursuant to a set formula, as discussed below, other aspects of scanning are user definable. For example, the user can decide to scan for certain text strings in the source codes of the files that comprise Foo 12 potentially indicative of property rights in those files or coding, such as copyright notices. Thus, as illustrated, using selection boxes 26 as one means of defining strings of interest, the user can decide to search the source code of the Foo files to look for the text strings "patent," "trademark," or "copyright," or similar words having potential implications to property rights (e.g., "license," "restriction," "owned," "rights," etc.). As such a text string search will find all instances of these words in the source code, such a search may inadvertently identify source code which in actuality has no bearing on potential properties rights. Accordingly, to assist in determining whether the scan has found relevant source code, boxes 26a can be used to capture text characters in the located source code both before and after the search terms 26 of interest to allow this code to be reviewed in context, as will be explained further below.

The "other" box 28 allows other types of user-defined codes to be searched in the source code. For example, a user can embed a special type of code corresponding to the format <userIP#> (i.e., user intellectual property code number) in the source code to allow it to be identified during a scan. Of course, many other ways of embedding searchable property-related strings in sources files are possible, and this is merely exemplary.

Scan settings such as those noted above may also be saved and retrieved using an appropriate menu 22, and as illustrated selection of this menu has allowed a search profile 22a ("AbodeIPSettingv3.fsf") to be loaded to save the user from having to select or retype the various options 26, 28, etc. into the user interface each time a scan is run. In any event, once the user's scanning parameters are loaded, the Foo 12 can be scanned (27) pursuant to the scheme disclosed below.

In a preferred embodiment, and referring to FIG. 4, the scanning application program 20 preferably scans the files of the new software product 12 ("Foo") in a variety of manners. As just mentioned, one way in which the Foo 12 can be scanned is by searching for relevant text strings (30) in the source codes of its constituent files as specified by the user interface screen of FIG. 3. Such a scan can render several different types of outputs, but in one embodiment, outputs potential "hits" located by the text string scan in a text string database file 45, called "strings.csv" in the disclosed example. One skilled in the art will understand that *.csv files represent a database file format generally lacking in significant formatting such that it can easy be read into other programs, such as Microsoft Excel.™ An example of the strings.csv file 45 is shown in FIG. 5. The database file 45 of FIG. 5 shows the source files (and their paths in column B), the text string criteria they meet (in column E), and the identified string as it appears in context in the source file (in column D) in accordance with 26a (FIG. 3). Ultimately the file string database file 45 will be loaded into a database application 60 which will allow the user to review, edit, and update the audit records for each of the files.

While text string searching of the source code provides one way for culling potential property rights in the software product, some of the files within the software product may also contain useful property rights information as part of its file system information. As one skilled in the art understands, file system information constitutes "header" information from the computer's operating system normally associated with a particular file, or which generally can be associated with a particular file at a user's discretion, as opposed to the actual contents of the source file.

Accordingly, scanning for such file system information is also performed on the new software product Foo 12 (35; FIG. 4) upon engaging the scan (27; FIG. 3). Scanning for such file system information can, like source code text string searching, also be tailored in accordance with user preferences at user interface screen of FIG. 3, although this is not shown. Instead, in the disclosed embodiment, scanning of the file system information in Foo 12 is programmed to yield the information as shown in FIG. 6A and 6B, which represents a file system information database file 50 referred to as "files.csv" 50. As shown, the file system information database file 50 includes typical system information concerning the files 14 which comprise the software product 12, such as its path (column B), size (column C), times the files were created and modified (columns D & E), as well as other pertinent data obvious from a review of FIGS. 6A and 6B.

Most importantly to the present application, the file system information database file 50 includes columns for "company name" (column H) and information concerning copyright information for the file ("File_Copyright," column M). As with the results acquired from the source code string scan (FIG. 5), such property-right-based file system information from the file system information database file 50 will be loaded into a database application 60 which will allow the user to review, edit, and update the audit records for each of the files.

Also present in the file system information database file 50 is an electronic identifier (i.e., an electronic identification code or "fingerprint") for each of the scanned files 14, which in a preferred embodiment is generated for each of the files 14 using the well-known "MD5" algorithm (40; FIG. 4). As one skilled in the art will appreciate, the MD5 algorithm creates a "fingerprint" for a file based on its content. Without going to unnecessary detail, the algorithm assesses the content of the file and processes it to arrive at a 128-bit fingerprint for the file. Using this algorithm, it is extremely unlikely that two different files would have the same MD5 fingerprint, and thus the use of the MD5 algorithm provides a reliable way of identifying a particular file. The MD5 algorithm can be run on the content of the file (as shown in column N) or on its path name (column O), should it also be useful to know and track the particular path (column B) at which the file was stored in the user's system. Ultimately, the MD5 fingerprints from the file system information database file 50 will be loaded into a database application 60. Of course, other versions of MD5 fingerprints (i.e., MDx) could also be used, as well as other similar fingerprinting schemes.

Thus, to summarize, through use of the scanning application 20 in one embodiment, the files 14 for the audited software product 12 are (1) scanned for potential property rights information in their source code, (2) scanned for potential property rights information in their file system information, headers and (3) have MD5 fingerprints generated for them. Moreover, and noted above and shown in FIG. 4, these pieces of information are fed to a database application 60 (e.g., the Adobe Intellectual Property Audit System (AIPAS)™) to generate or retrieve audit records 150 for each of the files 14. While disclosed as being separate from the scanning application 20, one skilled in the art will appreciate that the scanning application 20 and the database application 60 can be integrated such that their separateness is transparent to the user.

Figure 7:
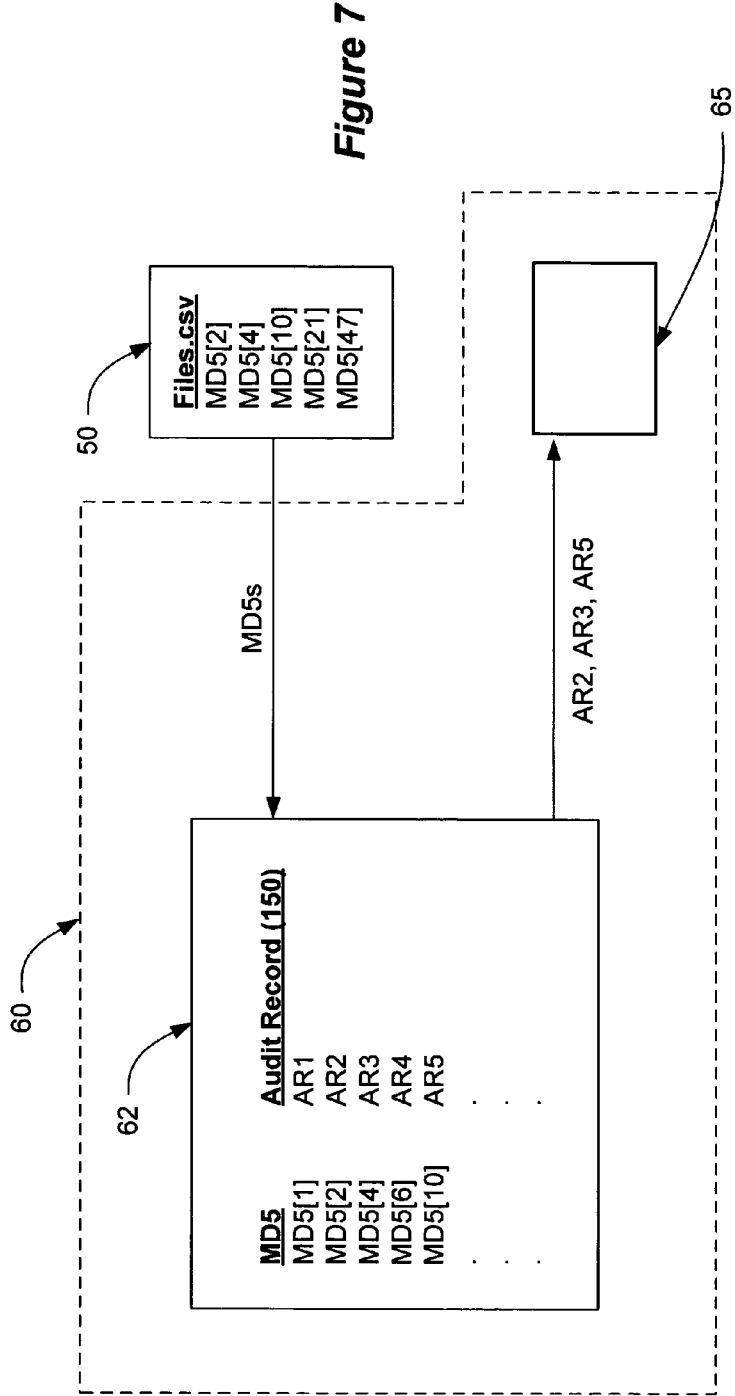
FIG. 7 illustrates the process of using the fingerprints for the scanned files to potential retrieve previously-generated audit records for the files.

Preferably the first thing that occurs in the audit record database application 60 is to see if any of the scanned files 14 have already been the subject of an audit, such that their audit records can be retrieved rather than be generated from scratch. Referring to FIG. 7, this preferably occurs using the MD5s generated from the scan. In this regard, the MD5s from the database file 50 created during scanning are loaded into the database program 60, and are sent to a database of previous audit records 62. The stored audit records (AR1, AR2, etc.) are keyed to MD5 fingerprints generated earlier when the files represented by the audit records were previously scanned. The newly generated MD5s are sent to the database 62 to look for a match. If a match is determined (e.g., for MD5[2], [4] and [10]), it is highly reliable that the previously stored audit records (e.g., AR2, AR3, and AR5) represent the same files that are now to be audited, and accordingly those audit records are loaded into a record viewing/auditing application 65. Of course, in alternative embodiments, the record can be updated as it is retrieved. For example, if potential property rights have been determined via the scan, i.e., if relevant property strings in the source code (30; FIG. 4) or file system information (35; FIG. 4) have been located which are not presently in the audit record for that file, that audit record can be updated during the retrieval process.

By contrast, if no match is found, an audit record is generated from scratch, and is populated with pertinent property rights information (if any) gathered from the source file scan or the scan of the file system information as noted earlier. As one skilled in the art will appreciate, this gives a user of the system a big advantage in performing a property rights audit, as previously identified issues (from previous audit records) and/or new potential issues (as determined by the scan) are presented to the user for review and/or action.

Regardless of whether audit records are retrieved, updated, or generated from scratch, at the end of the scan an audit record 150 is preferably compiled for each file 14 within the software product 12 under analysis. Thus, as shown in FIG. 8, if "n" files are present, "n" audit records (AR1-ARn) 150 are ultimately compiled and are made available to the user via a record viewing/auditing application 65.

Figure 8:
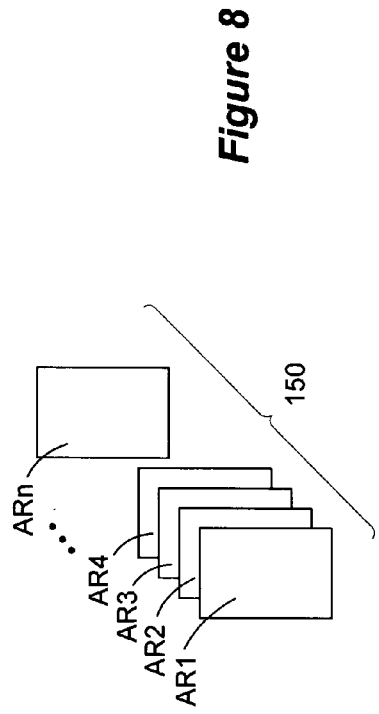
FIG. 8 illustrates the existence of an audit record for each of the "n" files within the software product.

A single audit record 150a is shown in FIG. 8 as displayed by the record viewing/auditing application 65. The record viewing/auditing application 65 preferably constitutes the well-known FileMaker Pro™ software, which is a program useful for viewing database records. However, any other suitable user interface could be used to view and edit the records. Moreover, it should be understood that the display and organization of the audit record 150a is merely exemplary, and that the records can be displayed and organized in many different useful ways as is the case with any database application.

As well as including standard toolbars and Windows™-based features 151, application 65 displays the name of the software product being audit as well as its audit number 152. Additionally, a particular one of the "n" audit records is shown for a particular file 14 ("instmsiw.exe"), along with other metadata particulars such as its path name, MD5 information, and record number within the software product 155. Each audit record for each file 14 can be sequentially scrolled through using buttons 154 or in any other conventional way.

For each audit record 150a, useful auditing information can be displayed in any number of ways, and as shown is made displayable using a series of tabs 153. Each tab allows additional useful information to be displayed concerning the displayed record for the file 14, including certain summary "Details"; a link to licensing information pertaining to the file; a "List" tab, which allows all of the files 14 to be listed in window along with certain key information (such as potential third party property rights and audit status; not shown); and a "Reports" tab, which is described in further detail below.

As shown, under the "Details" tab 153, information pertaining to potential property rights gleaned from the scan are displayed in areas 158 and 159. Specifically, potential property right strings found from a search of the source code (e.g., FIG. 5, column D) are displayed in area 158. Because it is useful to understand which strings appear to be those of a third party versus those belonging to the software producing entity, the area is logically automatically subdivided. In a preferred embodiment, all identified strings for a file are displayed, assuming that more than one is present. Likewise, potential property rights determined from file system information (e.g., FIG. 6B, column M) are displayed in area 159.

Also shown under the details tab 153 are note areas 157, which allow a user to manually enter information pertinent to the audit of the file presently being displayed. In a preferred embodiment, the note areas 157 are separated in "legal" and "engineering" areas, to allow either legal or engineering staff to participate in the audit and to record relevant thoughts concerning the audit, hopefully as assisted by the scanning procedure which occurred earlier. This is useful because both of these teams in an enterprise may perform different auditing tasks. In either of the 157 areas, a freehand text space allows auditor comments to be included, and indicators are included to allow the auditor to flag the audit for the particular file as presently unaudited, in process, or completed. Additionally, the auditor's name can be included. Other logical or helpful information may likewise be included in areas 157, such as date/time information, etc.

Also displayed in the audit record 150a is archival information concerning previous audits 160 that have occurred with respect to the displayed file 14, including the previous audit number, audit date, and the name of the auditor. These fields can be manually updated each audit, or can be automatically complied based upon information entered previously into the record. One skilled in the art will also note that other fields evidencing the auditing history for the file can also be used, and that the displayed fields are merely exemplary. Such information may also comprise links to allow the original archived audit information to be received directly.

As mentioned previously, a particular software product 12 being audited may comprise thousands of files 14. Accordingly, application 65 provides several different ways to easily organize and display only certain of the audit records for the files. In one embodiment, subsets of the audit records are viewed using the "Scripts" menu 162. As shown in FIG. 10, this menu 162 allows a user to select (via a drop down menu for example) the display of only those audit records meeting a certain criteria. For example, the user can choose to present all audit records; only previously audited records; audit records in accordance with their status as unaudited, in progress, or complete (and by legal or engineering); newly generated audit records (e.g., not pulled from database 62); audit records containing some indication of potential 3rd party rights; audit records containing some indication of potential rights of the entity that created the software product; audit records containing copyright information, or patent information, or which are subject to a license, etc. Of course, these are only exemplary ways of defining subsets of the auditing records, and in an actual embodiments, other schemes may be used. Additionally, Boolean schemes and word searching schemes may also be used (e.g., "New" & "Copyright"; "Patent" but not "license"; searching for particular "3rd Parties"; etc.). Once a particular script 162 is chosen, the subset of audit records can be navigated through using scroll buttons 154 or using other known navigation techniques. It will be appreciated that the determination of the subset of records to be displayed can depend on information automatically gleaned from the scan (e.g., copyright information) or information manually input by the user (e.g., status).

Figure 12:
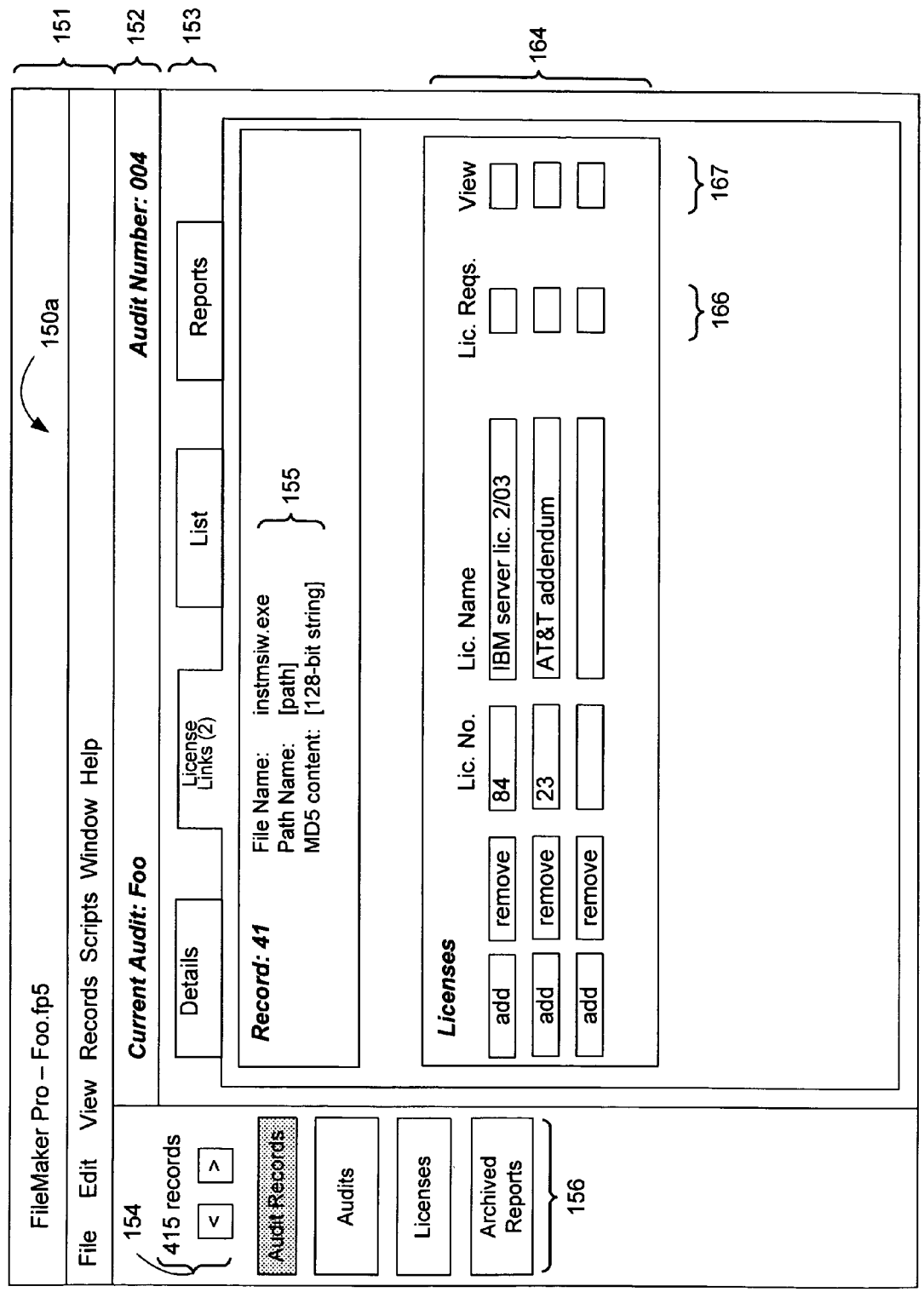
FIG. 12 illustrates a "License Links" screen of the audit record informing of the licenses pertaining to the particular file and/or audit record.

The "License Link" tab 153 provides a link to licensing information pertaining to the file whose audit record 150 is currently being displayed. In the displayed example, two licenses have pertinence to the file 14 at hand, as indicated by the indication "(2)" in the tab 153. Selecting this tab brings the user to the screen of FIG. 12, which shows pertinent license information in area 164. Specifically, the name of the license is shown, along with an internal license number. If diligence shows that a license should be removed (e.g., is no longer valid) or added, buttons are provided to assist in updating the record. Also provided are buttons 167 which allow the actual license document to be viewed, which may comprise a scanned bit map of the license stored with the audit record and/or containing a link to the same. Buttons 166 provide a link to license requirements as determined by a diligence review, and as will be explained in further detail with respect to FIGS. 13 and 14.

Figure 9:
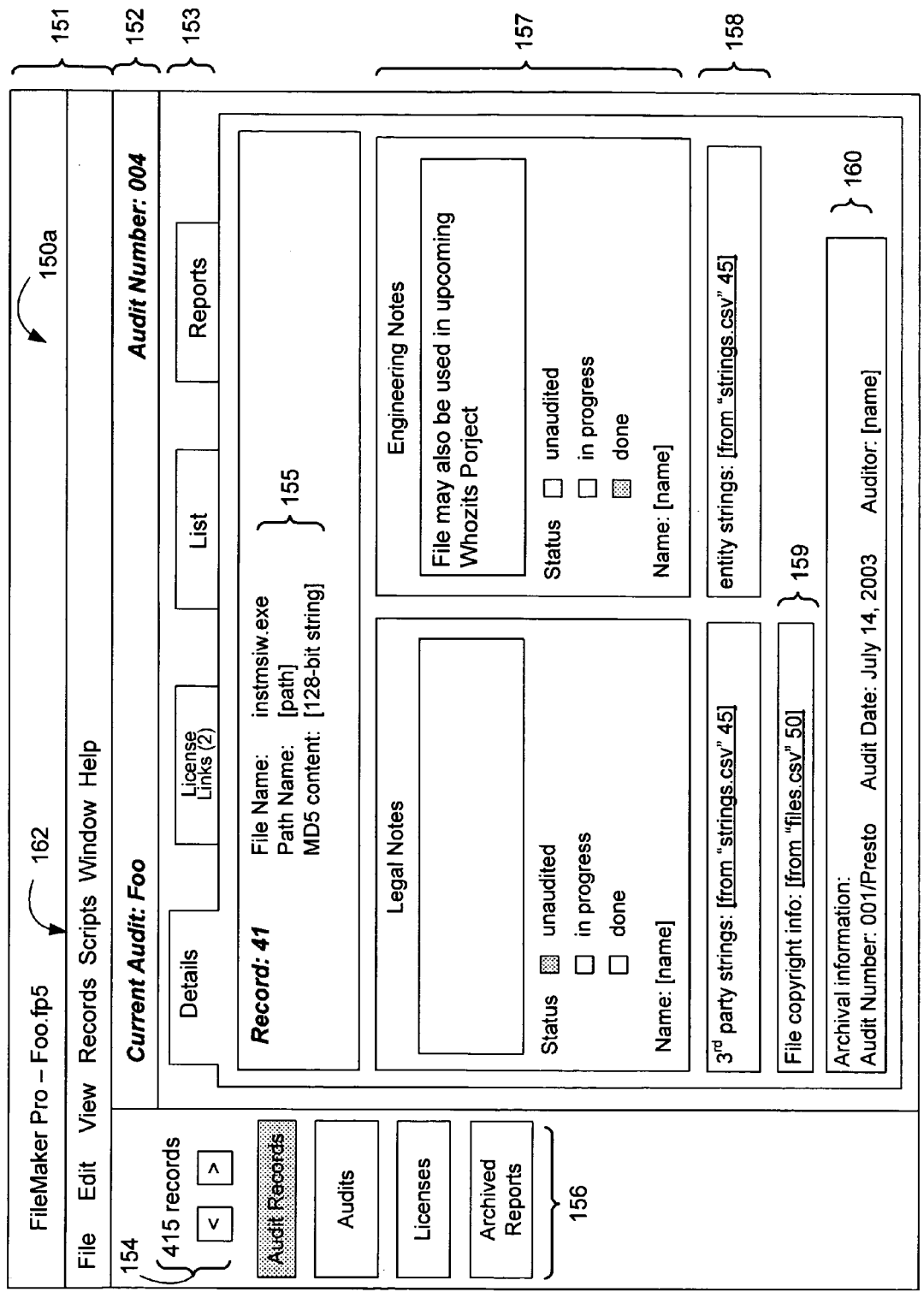
FIG. 9 illustrates a "Details" screen of an audit record for a particular file.

Referring again to FIG. 9, buttons 156 allow the user to choose different functions within the record viewing/auditing application 65. Shown in FIG. 9 is the "Audit Records" function, which allows individual audit records 150 for each of the files 14 to be reviewed and edited, as noted. The "Audits" button allows the user to choose a particular audit, e.g., by audit number, which may pertain to a different software product 12 under analysis or previously analyzed. The "Archived Reports" button contains archived reports, for example, concerning files that are no longer validly associated with the system.

The "Licenses" buttons 156 allow license records to be entered into and reviewed using the audit system. This is particularly useful because, for example, a particular license might cover more than one source file or vice versa, and because different of those licensed source files may be used in different software products and accordingly might require diligence and/or review of such diligence in different audits. Such a relationship between the audit records (ARx) 150 and license records (LRx) 190 in the system is illustrated in FIG. 11. Although illustrated below in the context of a software copyright license, one skilled in the art will understand that the same principles and functionality are applicable to patents, patent licenses, or other property rights which could have applicability beyond the files 14 used in a particular software product 12 audit.

Figure 13:
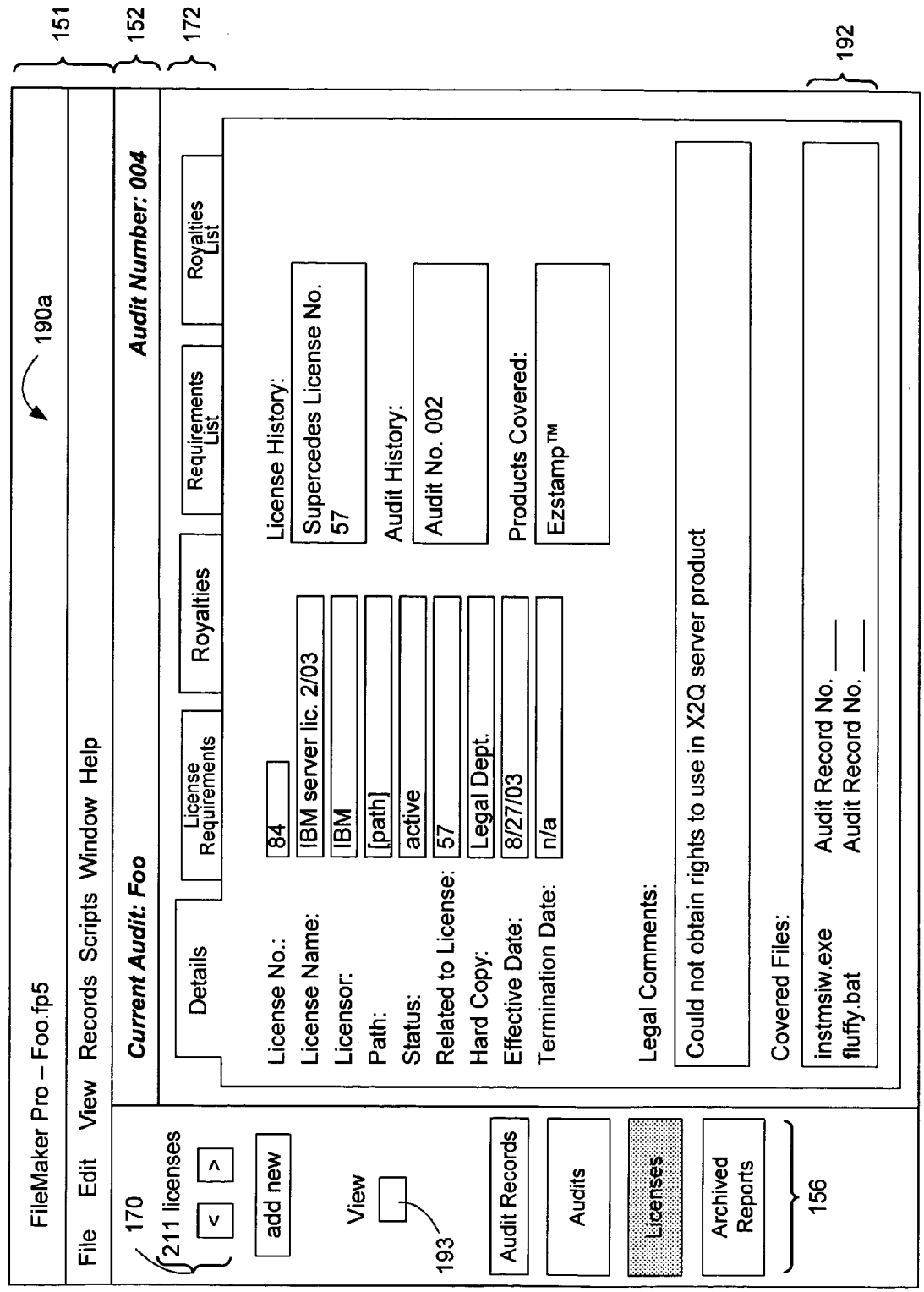
FIG. 13 illustrates a "Details" screen of a license record contains links to particular files and/or audit records.
Figure 14:
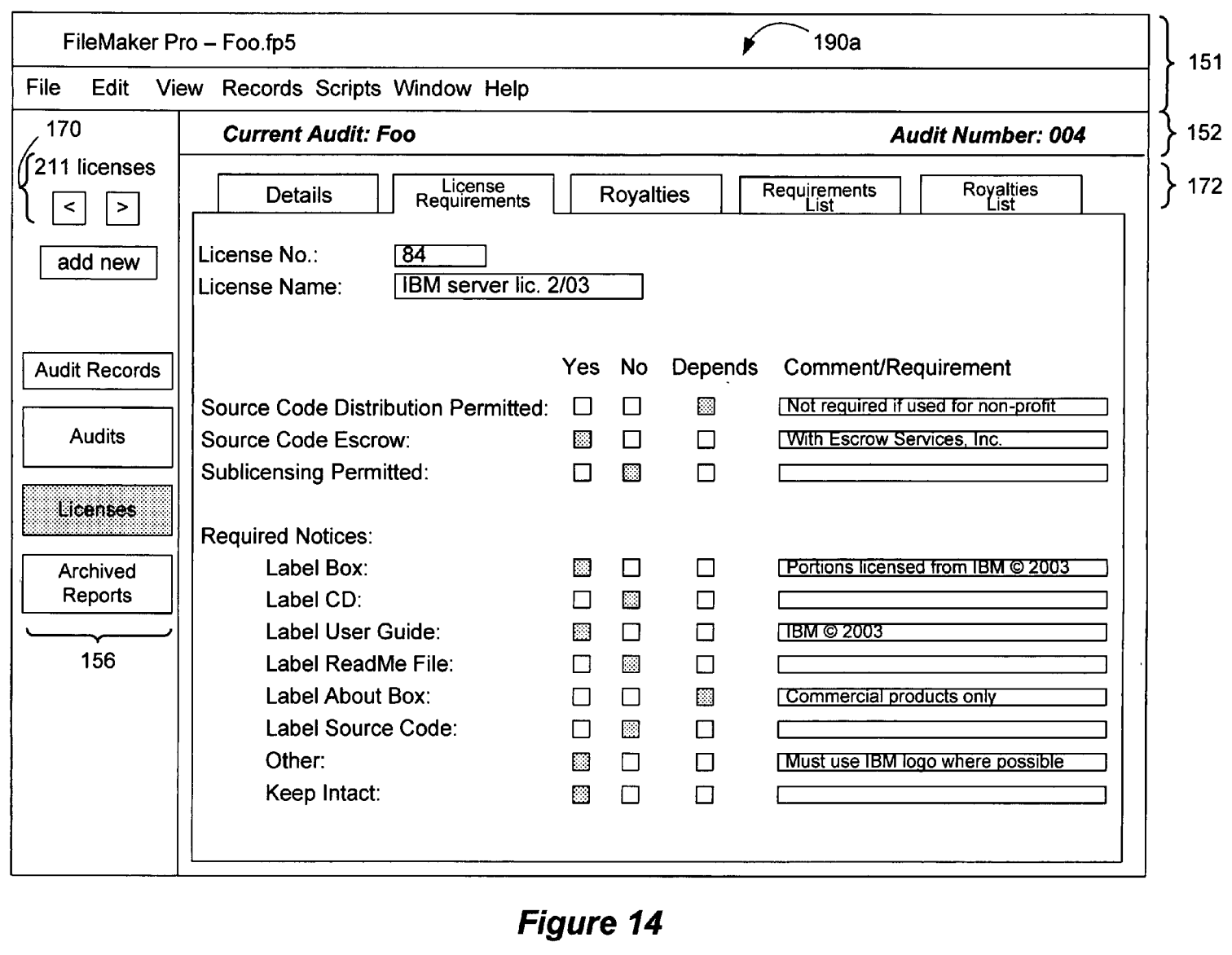

Any license record 190 can be reviewed by selecting the "Licenses" button 156, which moves the user outside of the particular audit that is being performed, and brings him initially to the screen of FIG. 13. An exemplary license record 190a is shown in FIGS. 13 and 14. As before, the license records can be scrolled through using buttons 170. Additionally, a particular license record 190 can be viewed by selecting button 166 (FIG. 11), which also takes the user to the screen of FIG. 13. As shown in FIGS. 13 and 14, the license record 190a reflects the results of legal diligence with respect to the particular license at issue. As with the audit records 150, the license records 190 are stored in the database 62 (FIG. 7), although MD5 fingerprinting would generally not be required. Also similarly to the audit records 150, the license records 190 can either be pulled from the database 62 (if they were the subject of prior diligence), or can be generated from scratch (by selecting the "add new" button in FIGS. 13 and 14, or by adding a license from the audit record 150 in FIG. 11). Additionally, if necessary, a "View" button 193 can be incorporated to allow the user to view an actual copy of the license under consideration, and preferably such a button would be redundant of the functionality of the "View" buttons 167 of FIG. 11.

Once it has been determined that a particular file 14 is subject to a particular license, the audit record 150 for that file 14 and the corresponding license record 190 can be linked with through the audit records or through the license records. Thus, the license record 190 can be added to the audit record 150 via the "add" button in box 164 FIG. 11. This operation preferably automatically adds the file 14 the to the "Covered Files" box 192 in the license record 190 (FIG. 13). Or, starting with the license record 190, the user can input names of particular files 14 covered by the license in the "Covered Files" box 192 in FIG. 13, which again would preferably cause the license to be automatically listed in the audit record 150 for the file (164, FIG. 11). Again, these means of linking the audit records 150 and license records 190 are merely exemplary.

As noted above, the user interface of FIG. 13 shows an exemplary license record 190a containing information about a specific license (in this case "IBM server license 2/03") and reflects diligence performed with respect to it. Thus, as shown, basic diligence information is shown (or entered by the user if the license record is new and not the subject of previous diligence), such as license name and number, where the license is stored electronically and physically in hard copy form, its effective and termination dates, its status as active, terminated or expired, its history, products known to be covered by the license, etc. A general comments section is also provided (e.g., noting that the license doesn't cover the "X2Q server product" in the given example). Also shown are various files 14 determined to be the subject of the license in box 192, which as noted above can be automatically or manually populated. Of course, other useful information concerning the license could also be displayed and recorded in the license record, and the illustrated pieces of information are thus merely exemplary. Moreover, it should be appreciated that certain aspects of the interface of FIG. 13 would be automatically populated on the basis of other information previously entered into the system by the user (e.g., covered files), while other information would be entered manually by a user performing diligence for the first time (e.g., effective and termination dates; status; etc.). Of course, if entered during a previous audit, one would expect most of the information to be automatically populated, although it could thereafter be edited as necessary.

FIG. 14 shows further diligence details concerning the particular license record under the "License Requirements" tab 172. Under this tab 172, check and text boxes are provided to allow the reviewer to enter standard license obligation information into the record 190a. Thus, in the example displayed, and upon a diligence review of the license, it may be determined that the licensed source code can be distributed under certain listed circumstances; that escrow of the source code is necessary; and that sublicensing is not permitted. Required notices or marking of software products incorporating the licensed files are also addressed, and in the example it is seen that the licensee must label the software box and its user guide with particular notices and should use the licensor's logo where possible, but that none of the label of the compact disc (CD) for the software product, the "Read Me" file, or the source code need to be labeled. Other tabs 172 provide for the entry or review of diligence information relating to royalty/compensation under the license, which may again provide various selections concerning what monies are due and when they are due (not shown). Still other tabs 172 provide license information in the form of lists in which each file 14 affected by the license is listed, thus providing in some instances an easier method for reviewing or entering necessary diligence information.

Once legal diligence concerning a particular license is complete and has been associated with particular files 14 (and audit records 150), such diligence need not be performed again in the future unless updates are necessary. This saves a user performing diligence from the need to re-review licenses for file coverage or licensing requirements each time they are determined to be implicated in a new software product 12.

Although exemplified by the use of "Licenses" button 156, it should be understood that additional buttons 156 would preferably be incorporated to allow a user to input or review other types of property rights information having potential global applicability to more than just the files 14 within a particular audit of a software product 12. For example, a "Patent" button 156 could be included to access patent records (not shown). Such patent records would preferably incorporate many of the features and links illustrated with respect to the "Licenses" button 156, as well as other features unique to patents. Similar buttons 156 regarding other potential property right could be used as well.

Legal diligence of the sort disclosed herein is of course not performed for its own sake, but instead with the goal of ensuring that property rights in the files 14 (either those of the entity or other third parties) are respected. Accordingly, the disclosed system is designed to make entered diligence information easy to review and to take action on if necessary. In this regard, a reporting function is preferably also included with the disclosed system, which informs the auditor of actions that should be taken in response to the accomplished audit. In one embodiment, a reporting tool is accessed by selecting the "Reports" tab 153 (FIG. 11), which takes the user to the report interface screen 200 of FIG. 15.

Figure 15:
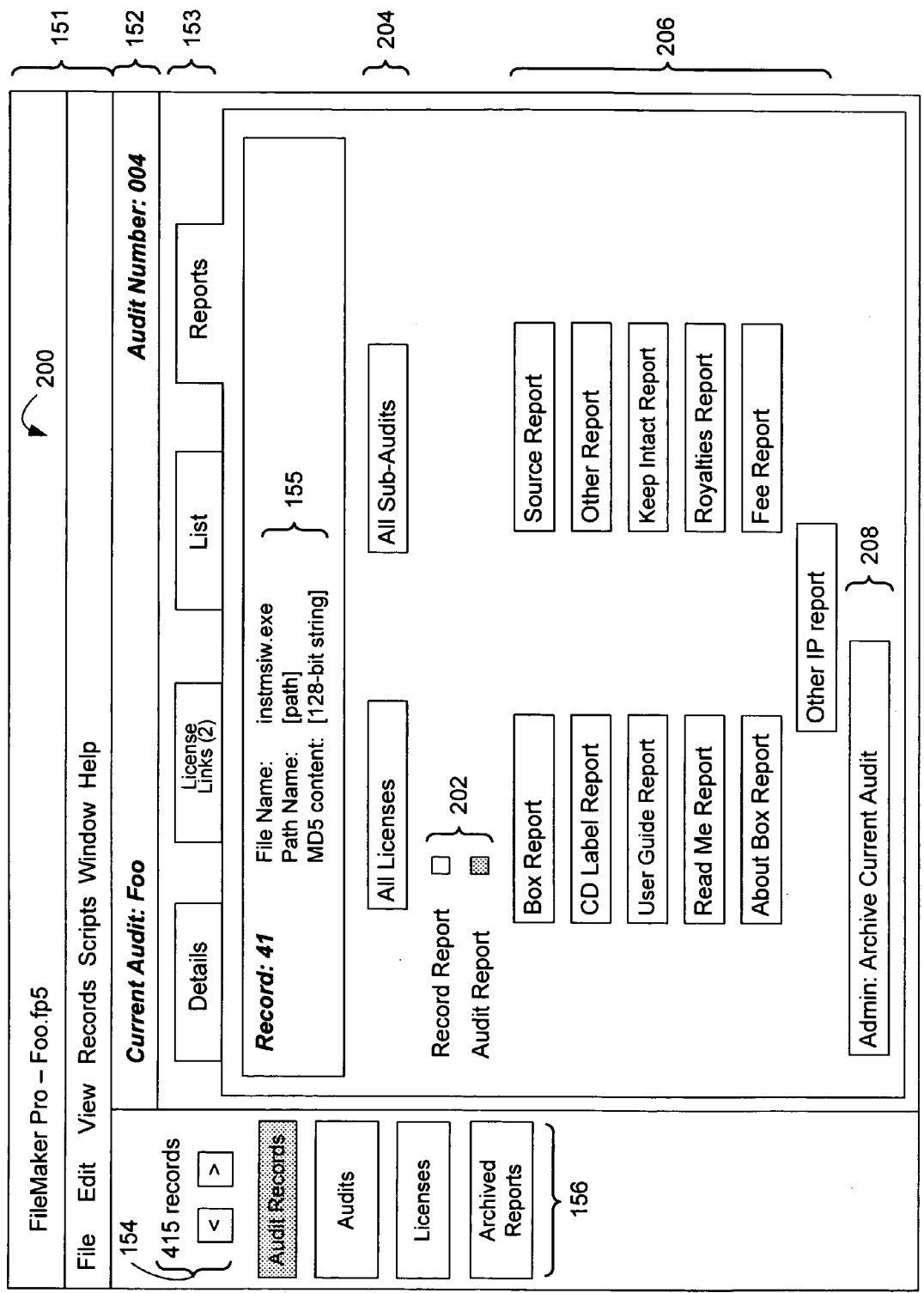
FIG. 15 illustrates a reporting screen for generating reports using the data present in the audit records and/or license records.

In FIG. 15, selection of the various buttons present allow the user to generate a variety of reports based on the data present in the audit record(s) 150 or license record(s) 190. Reports concerning all licenses affecting the current audit can be selected using the "All Licenses" buttons 204, which exports necessary data from the license records 190 to a report generating application (not shown), which in turn compiles a report that is printable and easily readable by a user desiring to take appropriate action. Such a licensing report is useful, for example, to understand how many files 14 are affected by a particular audit and/or to understand the basic terms of the license. Additionally, and although not shown for clarity, reports concerning all licenses entered in the system can also be run regardless of any particular audit or file 14. Moreover, other types of global reports can be generated regarding other types or property rights, such as patents. In this regard, an "All Patents" button 204 could be provided (although not shown) which would function substantially similarly to the "All Licenses" button.

Buttons 206 are similar in that they allow reports to be generated for either specific audit records 150 (i.e., files 14) or for entire audits in accordance with selection of an appropriate check box 202. In a preferred embodiment, selection of any of the buttons 206 exports necessary data from the audit record(s) 150 to the report generating application (again, not shown), which compiles a report that is printable and easily readable by a user desiring to take appropriate action. For example, if the "Box Report" button is selected for a particular audit, a report is generated (not shown) listing all of the required notices to appear on the box. In this example, data would be pulled from the "License Requirements" portion of the license record 190 (FIG. 14), along with the wording of the notices entered there. Thus, that report can merely be sent to persons at the entity tasked with designing the box to ensure inclusion of the required notices on the software product's box.

Although exemplary reports are not shown, one skilled in the art will understand that such reports can be formatted in any number of different ways, and can be populated with information of the user's choosing. The important issue is that the reports contain and automatically pull from the audit records and/or license records whatever information is most important for the user to understand potential property rights information and to act accordingly.

The foregoing disclosed methods and their accompanying user interfaces and other functional aspects are easily programmable, and such programming would be a routine matter to a computer programmer of skill using any of a variety of different programming languages in the context of many different operating systems. Of course, the methods disclosed herein would be ultimately coded and stored on a computer-readable media, such as a compact disk, a tape, stored in a volatile or non-volatile memory, etc. While disclosed in the context of a traditional computer system, it should be understood that the disclosed methods are not so limited. For example, the disclosed methods can have applicability with respect to other devices such as handheld devices (Personal Data Assistants, cell phones, etc.) and other multimedia devices.

While disclosed as being useful in the context of a user interface, the disclosed methods do not require a user interface to function in all useful embodiments. For example, the disclosed methods can run automatically on a server on a periodic basis. This might be useful, for example, to automatically monitoring the software files present on a given user's system to see if unauthorized software is present. As such, the disclosed methods have utility in the network security/compliance arena, as well as in the context of the compilation of new software products.

Moreover, while the disclosed method are particularly useful in determining potential property rights in a software products, the techniques with some modification can be used to assign property rights information to various files. For example, a software producer supplying files to a third party might wish to provide audit records of the sort disclosed herein along with the files. In that case, scanning to determine potentially property rights could constitute assigning the property rights of the software producers into the audit records. "Determining" potential property rights should therefore be inclusive of both of these concepts.

An "audit" as used herein denotes a review process (having automated, or non-automated steps, or combinations of each) performed on a particular structure (software product, files, etc.) to gauge its compliance with any of a number of requirements (such as legal requirements, safety or technical requirements, etc.). Accordingly, an "audit record" as used herein denotes a record containing information reflective of the performance of such an audit.

It should be understood that the inventive concepts disclosed herein are capable of many modifications. To the extent such modifications fall within the scope of the appended claims and their equivalents, they are intended to be covered by this patent.

What is claimed is:

1. A method using a computer for tracking third party property right information in a software product comprising a plurality of source files, the method comprising:
   performing by the computer:
      generating, for each given source file of the plurality of source files of the software product, a respective first electronic identifier via a fingerprint generation function performed on content of said each given source file, wherein at least some of the content in said each given source file is program code content;
      determining, for each given first electronic identifier, whether said given first electronic identifier matches an identifier from a plurality of second electronic identifiers associated with respective audit records in a database, wherein the audit records are indicative of third party property right information for respective content of at least some of the plurality of source files, wherein third party property rights are rights of an entity other than an entity producing the software product and other than an end user of the software product;
      in response to determining a match between a given one of said first electronic identifiers and a given one of said second electronic identifiers:
         retrieving the respective audit record associated with said given one of said second electronic identifiers from the database, wherein the retrieved audit record indicates third party property right information for the content of one of the plurality of source files that is identified by the given one of said first electronic identifiers; and
      in response to determining that an other one of said first electronic identifiers does not match any of the second electronic identifiers:
         determining third party property right information for a particular content of a particular source file, wherein said determining third party property right information for the particular content of the particular source file includes evaluating the particular content of the particular source file upon which the generation of the other one of said first electronic identifiers is dependent;
         generating a respective audit record that comprises the determined third party property right information for the particular content of the particular source file; and
         linking the other one of said first electronic identifiers to the respective audit record in the database.

2. The method of claim 1, wherein the method comprises generating one or more of the first electronic identifiers via an MDx algorithm.

3. The method of claim 1, further comprising displaying retrieved audit records using a user interface of the computer.

4. The method of claim 3, wherein the retrieved audit records are displayed sequentially for each matched source file.

5. The method of claim 1, wherein the retrieved audit record comprises a link to a third party property right agreement.

6. The method of claim 5, wherein the third party property right agreement comprises a third party property right license.

7. The method of claim 1, further comprising:
   displaying the generated audit record via a user interface of the computer, and receiving input to the user interface to perform said linking.

8. The method of claim 1, further comprising generating a third party property right report including information from one or more of the retrieved audit record and the generated audit record.

9. A computer-implemented method for tracking third party property right information in a software product comprising a plurality of source files, comprising:
   performing by a computer:
      determining the third party property right information for content of each given source file of the plurality of source files of the software product, wherein said determining includes electronically scanning the content of the each given source file, wherein third party property rights are rights of an entity other than an entity producing the software product and other than an end user of the software product, and wherein at least some of the content in the each given source file is program code content;
      creating and storing in a data store, for each of at least some of the plurality of source files, a respective electronic audit record containing the determined third party property right information for the content of the respective source file;
      generating a respective first electronic identifier for each created and stored electronic audit record via a fingerprint generation function performed on the content of the given source file; and
      linking each first electronic identifier to each respective electronic audit record in the data store.

10. The method of claim 9, wherein the generation of each first electronic identifier is dependent upon the content of the source file for which the electronic identifier is generated.

11. The method of claim 9, wherein each first electronic identifier is generated via an MDx algorithm.

12. The method of claim 9, further comprising:
   displaying the created electronic audit records via a user interface of the computer; and
   receiving input to the user interface to perform said linking.

13. The method of claim 12, wherein the created electronic audit records are displayed sequentially.

14. The method of claim 9, wherein one or more of the created audit records comprise a link to a third party property right agreement.

15. The method of claim 14, wherein the third party property right agreement comprises a third party property right license.

16. The method of claim 9, wherein said scanning the given source file comprises scanning the content of the given source file for particular textual strings designated as being third party property right information.

17. The method of claim 9, wherein the method further comprises scanning file system information of each of the plurality of source files to determine third party property right information associated with the each given source file.

18. The method of claim 9, wherein to determine the third party property right information associated with the each given source file, the method comprises scanning the content and file system information of the each given source file for textual strings designated as being the third party property right information.

19. The method of claim 9, further comprising, for at least some of the plurality of source files, retrieving at least one of a plurality of previously created audit records stored in the data store, wherein said retrieving is based on respective first electronic identifiers generated dependent on respective content of said at least some of the plurality of source files, and wherein each one of the plurality of previously created audit records comprises third party property right information.

20. The method of claim 19, wherein said retrieving is performed in response to matching at least one of the respective first electronic identifiers to at least one of a plurality of second electronic identifiers linked to the plurality of previously created audit records in the data store.

21. A computer-implemented method for tracking third party property right information in a software product comprising a plurality of source files, comprising:
performing by a computer:
assigning a respective audit record to each of the plurality of source files of the software product; and
for each given source file of at least one of the plurality of source files:
determining that the given source file is subject to one or more third party property rights for content of the given source file, wherein said determining includes evaluating the content of the each given source file, wherein the third party property rights are rights of an entity other than an entity producing the software product and other than an end user of the software product, and wherein at least some of the content in the each given source file is program code content;
generating a respective third party property right record for each of said one or more third party property rights; and
linking said each respective third party property right record to the audit record assigned to the given source file.

22. The method of claim 21, wherein the third party property right record indicates obligations to be undertaken with respect to the given source file.

23. The method of claim 22, wherein the obligations comprise marking or royalty obligations.

24. The method of claim 21, further comprising, for said each given source file of at least one of the plurality of source files, generating a respective third party property right report.

25. The method of claim 24, wherein, for said each given source file of at least one of the plurality of source files, the respective third party property right report comprises third party property right obligations indicated by one or more third party property right records linked to the audit record assigned to the given source file.

26. The method of claim 21, wherein, for said each given source file determined to be subject to a third party property right, providing a link to a respective third party property right agreement.

27. The method of claim 21, wherein one or more of said respective third party property right records each comprise a link to an associated third party property right agreement.

28. A computer-implemented method for tracking third party property right information in a software product comprising a plurality of source files, comprising:
performing by a computer:
retrieving first audit records associated with a first set of the plurality of source files, wherein said retrieving includes processing the first set of the plurality of source files of the software product; and
generating second audit records associated with a second set of the plurality of source files concurrently with said retrieving, wherein said generating includes processing the second set of the plurality of source files of the software product, wherein generating a given second audit record for a given source file of said second set of the plurality of source files comprises:
determining third party property right information for content of the given source file, wherein said determining third party property right information for content of the given source file includes evaluating the content of said given source file, wherein third party property rights are rights of an entity other than an entity producing the software product and other than an end user of the software product, and wherein at least some of the content in each given source file is program code content; and
storing the third party property right information for the content of the given source file in said given second audit record for the given source file;
wherein the first audit records and the second audit records are each indicative of third party property right information for content of respective source files that are associated with the first audit records or the second audit records.

29. The method of claim 28, wherein the method comprises, prior to processing said first set of the plurality of source files, associating each source file of the first set of the plurality of source files with a respective unique first electronic identifier, wherein said retrieving said first audit records comprises retrieving each of the first audit records via a respective unique first electronic identifier associated with the respective first audit record.

30. The method of claim 29, wherein each first electronic identifier is generated based on the content of the respective source file of the first set of the plurality of source files to which the electronic identifier is associated.

31. The method of claim 29, wherein the first electronic identifiers are generated via an MDx algorithm.

32. The method of claim 28, wherein evaluating the content of said given source file comprises determining whether the content of said given source file contains textual strings designated as third party property right information.

33. The method of claim 28, wherein the method further comprises evaluating file system information of said given source file to determine third party property right information for said given source file.

34. The method of claim 28, wherein the method comprises scanning the content and file system information of said given source file for textual strings designated as third party property right information.

35. The method of claim 28, further comprising linking at least some of the first and second audit records to some of a plurality of third party property right records.

36. The method of claim 28, further comprising generating a respective third party property right report for each one of the plurality of source files.

37. The method of claim 36, wherein the third party property right report indicates third party property right obligations from third party property right records linked to the audit records.

38. A computer-readable storage medium containing program instructions for tracking third party property right information in a software product comprising a plurality of source files, wherein the program instructions are computer-executable to implement:
generating, for each given source file of the plurality of source files of the software product, a respective first electronic identifier via a fingerprint generation function performed on content of said each given source file, wherein at least some of the content in said each given source file is program code content;
determining, for each given first electronic identifier, whether said given first electronic identifier matches an identifier from a plurality of second electronic identifiers associated with respective audit records in a database, wherein the audit records are indicative of third party property right information for respective content of at least some of the plurality of source files, wherein third party property rights are rights of an entity other than an entity producing the software product and other than an end user of the software product;
in response to determining a match between a given one of said first electronic identifiers and a given one of said second electronic identifiers:
retrieving the respective audit record associated with said given one of said second electronic identifiers from the database, wherein the retrieved audit record indicates third party property right information for the content of one of the plurality of source files that is identified by the given one of said first electronic identifiers; and
in response to determining that an other one of said first electronic identifiers does not match any of the second electronic identifiers:
determining third party property right information for a particular content of a particular source file, wherein said determining third party property right information for the particular content of the particular source file includes evaluating the particular content of the particular source file upon which the generation of the other one of said first electronic identifiers is dependent;
generating a respective audit record that comprises the determined third party property right information for the particular content of the particular source file; and
linking the other one of said first electronic identifiers to the respective audit record in the database.

39. The computer-readable medium of claim 38, wherein the retrieved audit record comprises a link to a third party property right agreement.

40. The computer-readable medium of claim 39, wherein the third party property right agreement comprises a third party property right license.

41. The computer-readable medium of claim 38, wherein the program instructions are further computer executable to implement generating a third party property right report including information from one or more of the retrieved audit record and the generated audit record.

42. A computer-readable storage medium containing program instructions for tracking third party property right information in a software product comprising a plurality of source files, wherein the program instructions are computer-executable to implement:
determining the third party property right information for content of each given source file of the plurality of source files of the software product, wherein said determining includes electronically scanning the content of the each given source file, wherein third party property rights are rights of an entity other than an entity producing the software product and other than an end user of the software product, and wherein at least some of the content in the each given source file is program code content;
creating and storing in a data store, for each of at least some of the plurality of source files, a respective electronic audit record containing the determined third party property right information for the content of the respective source file;
generating a respective first electronic identifier for each created and stored electronic audit record via a fingerprint generation function performed on the content of the given source file; and
linking each first electronic identifier to each respective electronic audit record in the data store.

43. The computer-readable medium of claim 42, wherein the generation of each first electronic identifier is dependent upon the content of the source file for which the electronic identifier is generated.

44. The computer-readable medium of claim 42, wherein one or more of the created audit records comprise a link to a third party property right agreement.

45. The computer-readable medium of claim 44, wherein the third party property right agreement comprises a third party property right license.

46. The computer-readable medium of claim 42, wherein said scanning the given source file comprises scanning the content of the given source file for particular textual strings designated as being third party property right information.

47. The computer-readable medium of claim 42, wherein the program instructions are further computer-executable to implement scanning file system information of each of the plurality of source files to determine third party property right information associated with the each given source file.

48. The computer-readable medium of claim 42, wherein the program instructions are further computer-executable to implement for at least some of the plurality of source files, retrieving at least one of a plurality of previously created audit records stored in the data store, wherein said retrieving is based on respective first electronic identifiers generated dependent on respective content of said at least some of the plurality of source files, and wherein each one of the plurality of previously created audit record comprises third party property right information.

49. The computer-readable medium of claim 48, wherein said retrieving is performed in response to matching at least one of the respective first electronic identifiers to at least one of a plurality of second electronic identifiers linked to the plurality of previously created audit records in the database.

50. A computer-readable storage medium containing program instructions for tracking third party property right information in a software product comprising a plurality of source files, wherein the program instructions are computer-executable to implement:
assigning a respective audit record to each of the plurality of source files of the software product; and
for each given source file of at least one of the plurality of source files:

determining that the given source file is subject to one or more third party property rights for content of the given source file, wherein said determining includes evaluating the content of the each given source file, wherein the third party property rights are rights of an entity other than an entity producing the software product and other than an end user of the software product, and wherein at least some of the content in the each given source file is program code content;

generating a respective third party property right record for each of said one or more third party property rights; and linking said each respective third party property right record to the audit record assigned to the given source file.

51. The computer-readable medium of claim 50, wherein the third party property right record indicates obligations to be undertaken with respect to the given source file.

52. The computer-readable medium of claim 50, wherein the program instructions are further computer-executable to implement for said each given source file of at least one of the plurality of source files, generating a respective third party property right report.

53. The computer-readable medium of claim 52, wherein, for said each given source file of at least one of the plurality of source files, the respective third party property right report comprises third party property right obligations indicated by one or more third party property right records linked to the audit record assigned to the given source file.

54. The computer-readable medium of claim 50, wherein the program instructions are further computer-executable to implement for said each given source file determined to be subject to a third party property right, providing a link to a respective third party property right agreement.

55. The computer-readable medium of claim 50, wherein one or more of said respective third party property right records each comprise a link to an associated third party property right agreement.

56. A computer-readable storage medium containing program instructions for tracking third party property right information in a software product comprising a plurality of source files, wherein the program instructions are computer-executable to implement:

retrieving first audit records associated with a first set of the plurality of source files, wherein said retrieving includes processing the first set of the plurality of source files of the software product; and generating second audit records associated with a second set of the plurality of source files concurrently with said retrieving, wherein said generating includes processing the second set of the plurality of source files of the software product wherein generating a given second audit record for a given source file of said second set of the plurality of source files comprises:

determining third party property right information for content of the given source file, wherein said determining third party property right information for content of the given source file includes evaluating the content of said given source file, wherein third party property rights are rights of an entity other than an entity producing the software product and other than an end user of the software product, and wherein at least some of the content in each given source file is program code content; and storing the third party property right information for the content of the given source file in said given second audit record for the given source file;

wherein the first audit records and the second audit records are each indicative of third party property right information for content of respective source files that are associated with the first audit records or the second audit records.

57. The computer-readable medium of claim 56, wherein the program instructions are further computer-executable to implement, prior to processing said first set of the plurality of source files, associating each source file of the first set of the plurality of source files with a respective unique first electronic identifier, wherein said retrieving said first audit records comprises retrieving each of the first audit records via a respective unique first electronic identifier associated with the respective first audit record.

58. The computer-readable medium of claim 57, wherein each first electronic identifier is generated based on the content of the respective source file of the first set of the plurality of source files to which the electronic identifier is associated.

59. The computer-readable medium of claim 56, wherein evaluating the content of said given source file comprises determining whether the content of said given source file contains textual strings designated as third party property right information.

60. The computer-readable medium of claim 56, wherein the program instructions are further computer-executable to implement evaluating file system information of said given source file to determine third party property right information for said given source file.

61. The computer-readable medium of claim 56, wherein the program instructions are further computer-executable to implement linking at least some of the first and second audit records to some of a plurality of third party property right records.

62. The computer-readable medium of claim 56, wherein the program instructions are further computer-executable to implement generating a respective third party property right report for each one of the plurality of source files.

63. The computer-readable medium of claim 62, wherein the third party property right report indicates third party property right obligations from third party property right records linked to the audit records.

\* \* \* \* \*